US008515821B2

(12) United States Patent
Center et al.

(10) Patent No.: US 8,515,821 B2
(45) Date of Patent: Aug. 20, 2013

(54) ONLINE SYSTEM AND METHOD FOR LOCATING AND REFERRING AN AUTOMOBILE DEALER TO CUSTOMERS

(75) Inventors: Steven S. Center, Palos Verdes, CA (US); John P. Fulcher, Newport Coast, CA (US); Thomas G. Elliott, Hermosa Beach, CA (US); Richard E. Colliver, Long Beach, CA (US); Michael S. Keranen, Long Beach, CA (US); Roy T. Nakahira, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 3063 days.

(21) Appl. No.: 10/054,106

(22) Filed: Nov. 13, 2001

(65) Prior Publication Data

US 2003/0171964 A1    Sep. 11, 2003

Related U.S. Application Data

(60) Provisional application No. 60/247,940, filed on Nov. 13, 2000.

(51) Int. Cl.
G06Q 30/00 (2012.01)

(52) U.S. Cl.
USPC ........................................ 705/26.2; 705/26.9

(58) Field of Classification Search
USPC ............. 705/1.1, 14.53, 26.7, 317, 347, 26.2, 705/26.9
See application file for complete search history.

(56) References Cited

U.S. PATENT DOCUMENTS

| | | | |
|---|---|---|---|
| 4,757,267 A * | 7/1988 | Riskin | 379/114.24 |
| 5,737,726 A | 4/1998 | Cameron et al. | |
| 5,758,328 A | 5/1998 | Giovannoli | |
| 5,794,207 A | 8/1998 | Walker et al. | |
| 5,813,006 A | 9/1998 | Polnerow et al. | |
| 5,991,735 A | 11/1999 | Gerace | |
| 6,014,638 A * | 1/2000 | Burge et al. | 705/7.29 |
| 6,014,644 A | 1/2000 | Erickson | |
| 6,014,647 A | 1/2000 | Nizzari et al. | |
| 6,026,371 A | 2/2000 | Beck et al. | |
| 6,041,311 A * | 3/2000 | Chislenko et al. | 705/27 |
| 6,044,368 A | 3/2000 | Powers | |
| 6,073,138 A | 6/2000 | de l'Etraz et al. | |
| 6,092,053 A | 7/2000 | Boesch et al. | |
| 6,157,928 A | 12/2000 | Sprenger et al. | |
| 6,826,552 B1 * | 11/2004 | Grosser et al. | 706/47 |
| 7,302,429 B1 * | 11/2007 | Wanker | 1/1 |

OTHER PUBLICATIONS www.dealerconnection.com, as published on Oct. 13, 1999, according to the Way Back Machine on Apr. 16, 2013.*
"Why customers come back to buy again", Nation's Business (Pre-1986), Nov. 1973, 61, p. 74, Proquest Central, retrieved from http://search.proquest.com/docview/231647418?accountid=14753.*

* cited by examiner

Primary Examiner — Carrie Gilkey
(74) Attorney, Agent, or Firm — McDermott Will & Emery LLP

(57) ABSTRACT

The system refers a prospective customer to one or more prospective dealers. It identifies those dealers closest to the customer and gives preference to those with which the customer has had a previous relationship. A database stores customer contact information and information related to dealer locations. Using a computer, the prospective customer is prompted to enter some personal information. A database query checks for matching data in the customer contact database. A search of the dealer locations nearest to the customer is then performed. Results are combined and the display recommends at least one dealer location, giving preference to those locations where there has been a prior relationship.

26 Claims, 5 Drawing Sheets

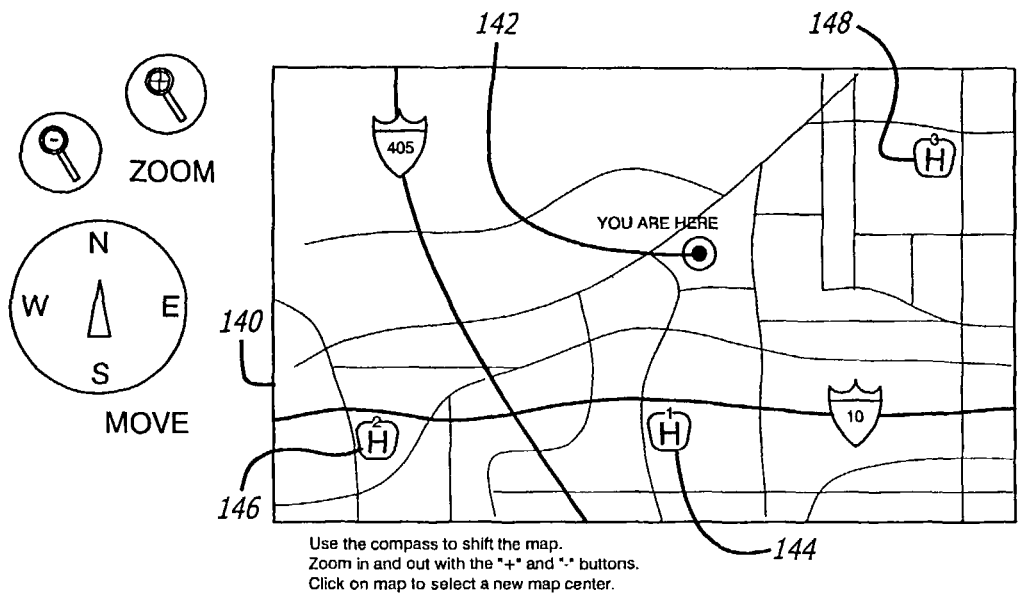

Use the compass to shift the map.
Zoom in and out with the "+" and "-" buttons.
Click on map to select a new map center.

FIG. 5

150 { Miller Honda-Culver City
9077 Washington Blvd Culver City CA, 90232-2501
Phone: 310 815 3888    Fax: 310 287 0364

152 —— Visit the Miller Honda-Culver City site
154 —— E-mail Miller Honda-Culver City

156 ——● GET DRIVING DIRECTIONS

158 —— Honda of Santa Monica
1720 Santa Monica Blvd Santa Monica CA, 90404-1907
Phone: 310 264 4900    Fax: 310 453 1407

Visit the Honda of Santa Monica site
E-mail Honda of Santa Monica

160 —— Honda of Hollywood
6511 Santa Monica Blvd Los Angeles CA, 90038-1407
Phone: 323 466 3247    Fax: 323 462 0187

Visit the Honda of Hollywood site
E-mail Honda of Hollywood

162 —— [ SEARCH FOR MORE DEALERS ]

ONLINE SYSTEM AND METHOD FOR LOCATING AND REFERRING AN AUTOMOBILE DEALER TO CUSTOMERS

RELATED APPLICATIONS

This application claims the benefit of and incorporates by reference U.S. Provisional Patent Application No. 60/247,940, filed Nov. 13, 2000, entitled "Online System and Method for Locating an Automobile Dealer."

BACKGROUND OF THE INVENTION

1. Field of the Invention

The present invention relates to a system and method for referring a particular business to a prospective customer. More particularly, the present invention is directed to referring an automobile dealer to a customer.

2. Background of the Invention

Companies strive for repeat business from past or present customers Though new customers are important to business growth, they often are responsible for a smaller percentage of revenues.

This application refers to two levels of businesses, manufacturers and dealers. This application refers to manufacturers but the term may include importers or other businesses that market and sell products through multiple dealers. Manufacturers compete among themselves. For example, one automobile manufacturer competes with all other automobile manufacturers. Automobile dealers of one manufacturer compete not only with automobile dealers of all other manufacturers, they also compete with many other automobile dealers of their own manufacturer.

Because manufacturers compete among themselves, each wants to simplify the process of having potential customers locate its dealers. In some industries, many manufactures have web sites to provide detailed product information and dealer locations. Though providing information about new products likely will stimulate increased sales by a dealer's existing customers, dealers recognize that providing information about competing dealers for the same products may work against the dealer with the existing customers. Therefore, dealers act to retain existing customers.

Recording customers' contact information and following up with those customers is a technique that businesses commonly use to obtain repeat business. Businesses store this information at a central location where the information is accumulated and accessed later. The follow-ups include sending customers coupons, information regarding special promotions, newsletters, or birthday or holiday greeting cards. Businesses also use databases of customer contact information to research trends in the behavior of consumers and target the businesses' proper audience more accurately.

These approaches have drawbacks, however, and they have not worked very effectively. Many customers find being contacted by businesses bothersome. Many do not want to reveal personal information. Repeat sales often fail to result from the efforts. Many customers fail to act on these incentive programs. Even customers taking advantage of these incentives may not buy again from a dealer.

Manufacturers often refer prospective customers to the automobile dealer that is closest to the prospective customer. For example, it is commonly known to search for businesses and conveniently locate the closest one to a particular location through the Internet. Companies often have "locator" functions on their web sites. These "locators" usually consist of a form which prompts the customer to enter an address, and the "locator" returns the closest business locations to that address to the customer, often with a map of the location and driving directions. Some locators provide customers with a choice of two or more of the closest dealers. Still others allow customers to choose the distance they are willing to travel and then identify the dealers within that distance. This technique, however, may send a prospective customer to a new dealer. Therefore, it works against dealers who have existing relationships with customers.

Limiting dealer information for customers adversely affects manufacturers, however. Prospective customers may want a manufacturer's product but dislike their original dealer. If a Website only provides the name of the previous dealer, the customer may seek another manufacturer's product.

SUMMARY OF THE INVENTION

It therefore an object of the present invention to provide dealers or businesses with a method by which to attract past customers to return to them for business. Another object of the present invention is providing customers with multiple dealer information when appropriate and desired by the customer. It is further an object of the present invention to provide customers with a convenient way to locate a nearby dealer. It is further an object of the present invention to provide an online system and method for identifying nearby dealer locations to a customer. It is yet another object of the present invention to provide a method for identifying dealer locations to customers while giving priority to those dealer locations with which the customer has had prior business relationships.

The present invention accomplishes these and other objects by providing an automated method for referring a prospective customer to one or more prospective dealers. In one embodiment, the present invention provides a system and method for identifying those dealers closest to the customer and giving preference to those with which the customer has had previous relationships.

In one embodiment, the present invention employs a database to store customer contact information and information related to dealer locations. The prospective customer, who uses a computer, is prompted to enter personal information. The database is queried using the information entered by the prospective customer. The query checks for matching data in the customer contact database. The systems performs a search of the dealer locations nearest to the customer. The present invention recommends at least one dealer location, giving preference to those dealers where the customer has had a prior relationship. The system then displays the results to the customer in an organized fashion, aiding the customer in easily contacting and visiting the dealer or business location.

One embodiment of the present invention provides a system and method for referring a prospective customer to an automobile dealer or service location. In one embodiment, the prospective customer views a car manufacturer's web site from his or her home or office computer or other Web-enabled device. The web site prompts the customer to enter personal information, such as the customer's name, address and telephone number. The information is communicated from the user's computer or the like, over a computer network to a server, where software compares the data to entered data already stored in a customer database. If the software finds matches, the software further queries the database to identify any automobile dealers with which the customer has had a previous relationship. The software also identifies the types of relationship the customer had such as a previous purchase, automobile service, parts' purchase or other contact. The "customer" may only have visited the dealer to look at cars without a transaction. These all constitute different types of dealer-consumer relationships.

If the software finds a match in the database for a previous customer relationship, it examines the type of relationship based on a hierarchy of types of relationships. For example, a selling (or leasing) relationship, one type of relationship, may be ranked at the top of the hierarchy, with a service relationship ranked somewhere lower in the hierarchy. The results that are returned to the customer are ordered such that the highest in the hierarchy are listed first.

This benefits the dealer because a customer who previously bought a car at a dealer probably should take precedence over a customer who has just had a car serviced. Further, dealers who have had previous sales relationships with a customer will feel entitled to have priority over other dealers who had what the selling dealers consider lower quality relationships. Therefore, the list of dealers where the customer had previous selling relationships are listed, highlighting the dealer closest to the customer's address. Dealers with other types of prior relationships are listed below the list of selling relationships because selling relationships rank highest in the hierarchy of types of relationships. In fact, the system may only display selling dealers unless the customer requests to see more dealers by clicking the appropriate button or link. Moreover, the system may even limit the number of selling dealers initially displayed. For example, the system may rank selling dealers based on the date of the selling relationship. A dealer with a ten-year-old selling relationship may be ranked below a dealer with a two-year-old selling relationship and may even be ranked below a dealer with a current service relationship.

The present invention is not limited to automobile manufacturers and dealers and can apply to many businesses. The present invention also is not limited to relationships such as "selling" and "service" but applies to many types of business that have multiple locations. Though the present invention has its greatest applicability to dealers who sell for a single manufacturer, it also can find applicability for dealers who sell products from several manufacturers.

Customers as well as the business benefit from this invention. It is a useful tool for encouraging repeat business. The present invention also makes finding acceptable dealers easier for customers who may be researching various models on a car manufacturer's web site. The invention also benefits the manufacturer. By mating customers with dealers with whom the customer has dealt before, the customer is more likely to purchase the manufacturer's product instead of a product from a competitor.

BRIEF DESCRIPTION OF THE DRAWINGS

FIG. 4 is an example of a customer input screen of one embodiment of the present invention.

FIG. 5 is an example of an output screen of one embodiment of the present invention.

DETAILED DESCRIPTION OF THE PREFERRED EMBODIMENTS

In the following description, numerous specific details are set forth to provide a thorough understanding of the present invention. One skilled in the art will appreciate that the present invention may be practiced without some or all of these specific details. In other instances, the following description does not explain all well known process steps in detail to avoid unnecessarily obscuring the present invention.

Figure 1:
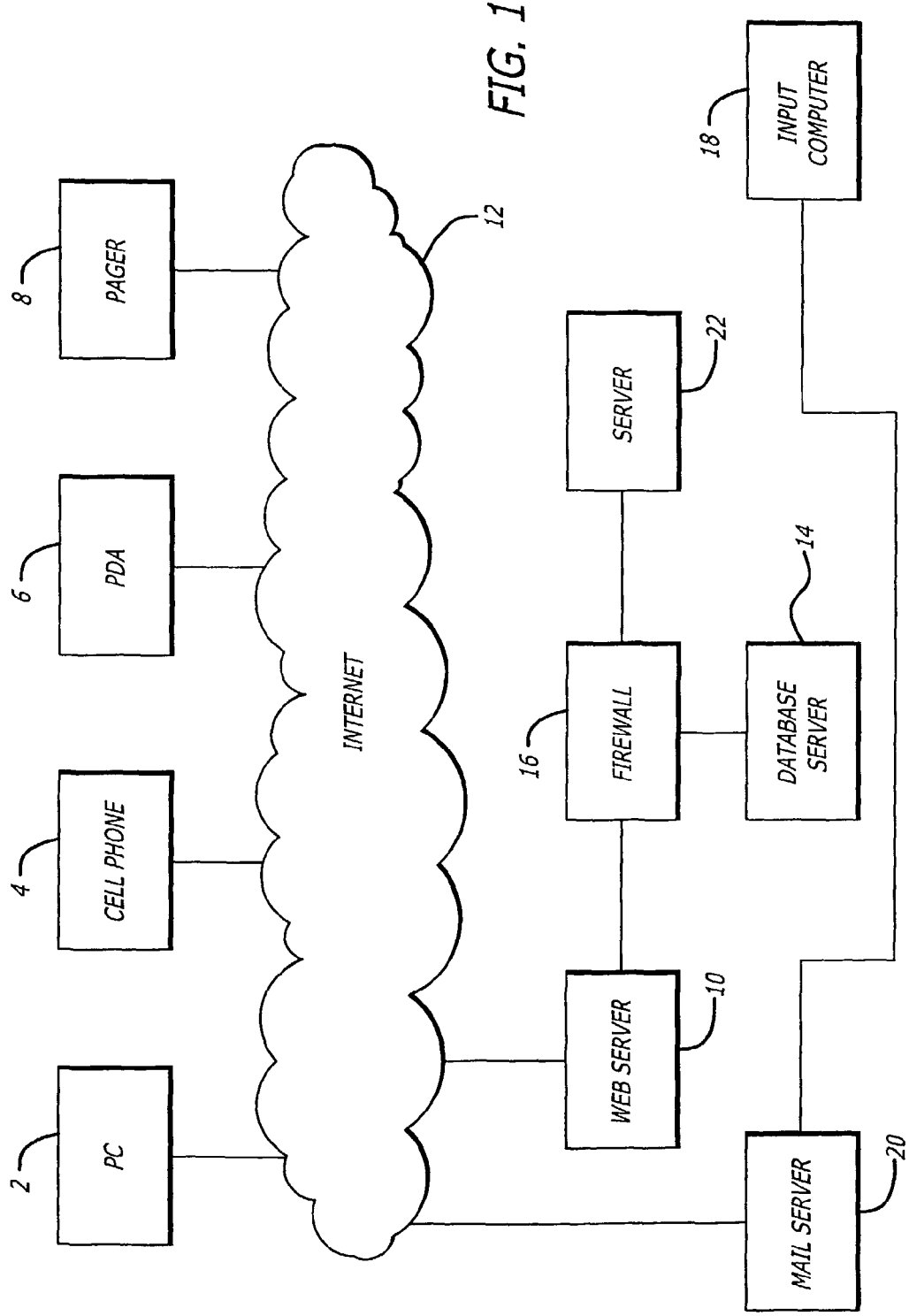
FIG. 1 is a schematic diagram of an embodiment of the system of the present invention.
Figure 2:
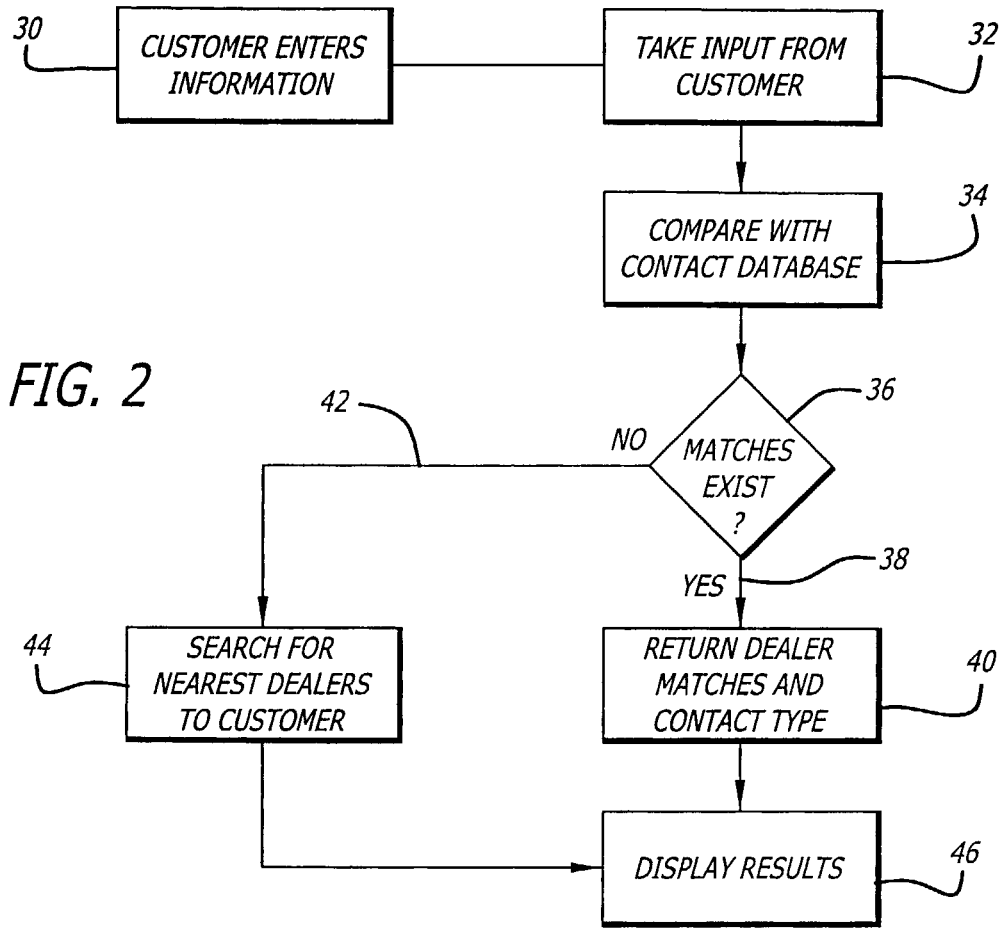
FIG. 2 is a flow diagram of an embodiment of the present invention.

FIGS. 1 and 2 illustrate one embodiment of the online system and method for referring a business or business location to a prospective customer. FIG. 1 depicts the high-level system architecture. A customer machine is typically a personal or networked computer 2 or other communications device, such as cellular telephone 4, personal digital assistant 6, two-way pager 8 or other web-enabled device. The customer machine includes structure that allows a customer to input information, a display, and a communication link. The customer machine connects through the Internet 12 via modem, network, cable, DSL, wireless or other connection to the system of the present invention.

The architecture of this exemplary embodiment follows the thin client paradigm where most of the functionality is pushed to the server in order to facilitate ease of maintenance and application development. The system includes a web server 10, which is a machine or service dedicated to serving a web site and its related content. The embodiment also includes a database server 14, which is a machine or service dedicated to the serving the database and its data. A firewall 16 may prevent customers or machines from accessing any of the components behind the firewall 16. In this way the customer machines have access to the web servers 10 but generally are not allowed direct access to the database server 12 or other machines behind the firewall 16. The database server 12 maintains, among other things, various database tables with information related to customer contact information, dealer information and other related data. Each web server 10 allows selective access to the database through certain scripts and for designated purposes.

Administration of the database server 14 is limited to an authorized input computer or terminal 18. A firewall (not shown) may prevent unauthorized access to the input computer 18. The input computer 18 can input profile data and other data to the database after entry of appropriate access codes or passwords. This is tightly controlled for security reasons. The data may only be added to an independent sub-database of the database server 14. Further, customer data is subsequently added to the main database server 14 only after scrutiny by the operator of the database through input computer 18. The system also may have appropriate privacy controls so that dissemination of customer data is strictly limited.

This system also may have a mail server 20. Access to it may also be protected by a firewall. Additionally, server 22 services the system.

As discussed previously, FIG. 1 uses the Internet. In the exemplary embodiment, the Internet 12 is a network of millions of interconnected computers. It includes systems owned by Internet service providers and information systems providers and includes communications hardware and software for handling the communications. Individual and corporate customers establish connections to the Internet in several known ways.

Information follows the flow diagram of the exemplary embodiment of FIG. 2. The first step of the dealer search process requires the past, current or prospective customer to enter personal information at 30. The person generally enters the information on a form as part of a web site. See FIG. 4, which is discussed below. A web browser such as Netscape Navigator or Microsoft Internet Explorer displays the form on the customer's computer. Other embodiments of the present invention devices could use a PDA, cell phone or pager. Therefore, one may practice the invention without using conventional web browsers.

This information entered normally consists of the customer's first and last name and his or her address. In certain embodiments of the present invention, only the customer's name is required, and the system queries the database or other sources for a corresponding address. Similarly, in another embodiment, the customer may be required to enter his or her address only. It is preferable, however, for customers to enter their names and addresses to ensure that the correct entry in the database is identified. The customer's name may comprise first name and last name, and the customer's address may comprise the street address, city, state, and zip code. Name and address values are automatically populated if they are available in a cookie. Unless the address is used to identify or verify the identity of a customer, a zip code may be sufficient for locating nearby dealers. The form may also request additional information such as a telephone number or e-mail address. Privacy laws and regulations may limit the collection and use of such data.

Once the personal information has been entered at 30 (FIG. 2), and the form is submitted at 32, the form is checked to see if the customer has entered all the required inputs. If the customer has not entered all of the required inputs, the server returns an error message which flags any missing inputs. Otherwise, if all the inputs are present, the server performs checks to validate the inputs. If an input is not valid (e.g., a non-existing zip code), the server generates an error message to tell the customer which inputs are not valid, and which to fix.

After the customer supplies the personal information at step 32, software acts on the data. The software sends the data to a central processing resource where a script takes the input information, constructs queries to the database based on this information, and filters and formats the results to be returned to the customer.

The script first opens a connection to the database. This connection may be unique to this session or may be kept open for further queries. The input parameters such as first name, last name, address, city, and zip code are arranged in a standardized format to be compared properly to the data in the database. In some cases, the input parameters may not be standardized perfectly, so the software must use the input as entered by the customer. The appropriate tables in the database are then queried, looking for matches based on last name and address. See step 36 (FIG. 2). The system counts the number of records with the same address and last name. In addition, if the software finds multiple records based on the last name, the software performs added comparisons using the first name or first and middle names.

If the system finds an address without a name match, several things could have happened. The person searching may share a last name (e.g., family member) with a past customer. The customer may have changed addresses and a new person with the same last name may have moved to that address. Also, people change names and may use initials, middle names or nicknames while searching. The address may have multiple residences (e.g., an apartment building or college dormitory). In addition, an error could have occurred. Matching records that exist in the database are recorded in an array for further analysis. The program can modify its output based on chosen criteria.

If, in step 36 (FIG. 2), the system determines that a match exists, the database is further queried to determine what relationships the customer had. Those relationships include the type of relationship (e.g., purchase, test drive, inquiry, service, parts purchase) for each dealer with which the relationship occurred. Furthermore, a stored procedure is executed to link dealer attributes for a dealer. In the exemplary embodiment, the relationship dealers are sorted between selling dealers and servicing dealers. Selling dealers are put ahead of servicing dealers in the exemplary embodiment. Selling or servicing dealers are sorted separately by most recent contact date in descending order (most recent first).

Thus, in FIG. 2, the system determines at step 36 whether a match exists. If a match does exist, the system proceeds along path 38 and returns the dealer matches and contact types. See step 40. The results are displayed at step 46. Normally, the most recent selling dealer would be displayed first followed by the other selling dealers. They would be followed by the most recent servicing dealers. The system would eliminate duplicates to list only once a dealer who sold to and serviced the customer. Queries to the database can be combined into a single SQL statement.

The system may discard relationships older than a predetermined number of years. Depending on the number of each type of dealer and the format of the display, all dealers may not fit on a page. If so, the system may display a "more dealers" button.

Otherwise, if the system finds no matching records, step 36 answers "no." The system proceeds along path 42 to step 44. There, the system searches for the dealer closest to the entered address. The results are displayed to the customer at step 46.

Depending on the criteria selected, the customer may have matched dealers (earlier sale or service relationship) with geographically closest dealers. Duplicates are eliminated. If the system finds a matched dealer, the system could hide the geographically closest dealers. The latter dealers would be displayed only if the searcher clicks on a button or other link.

Figure 3:
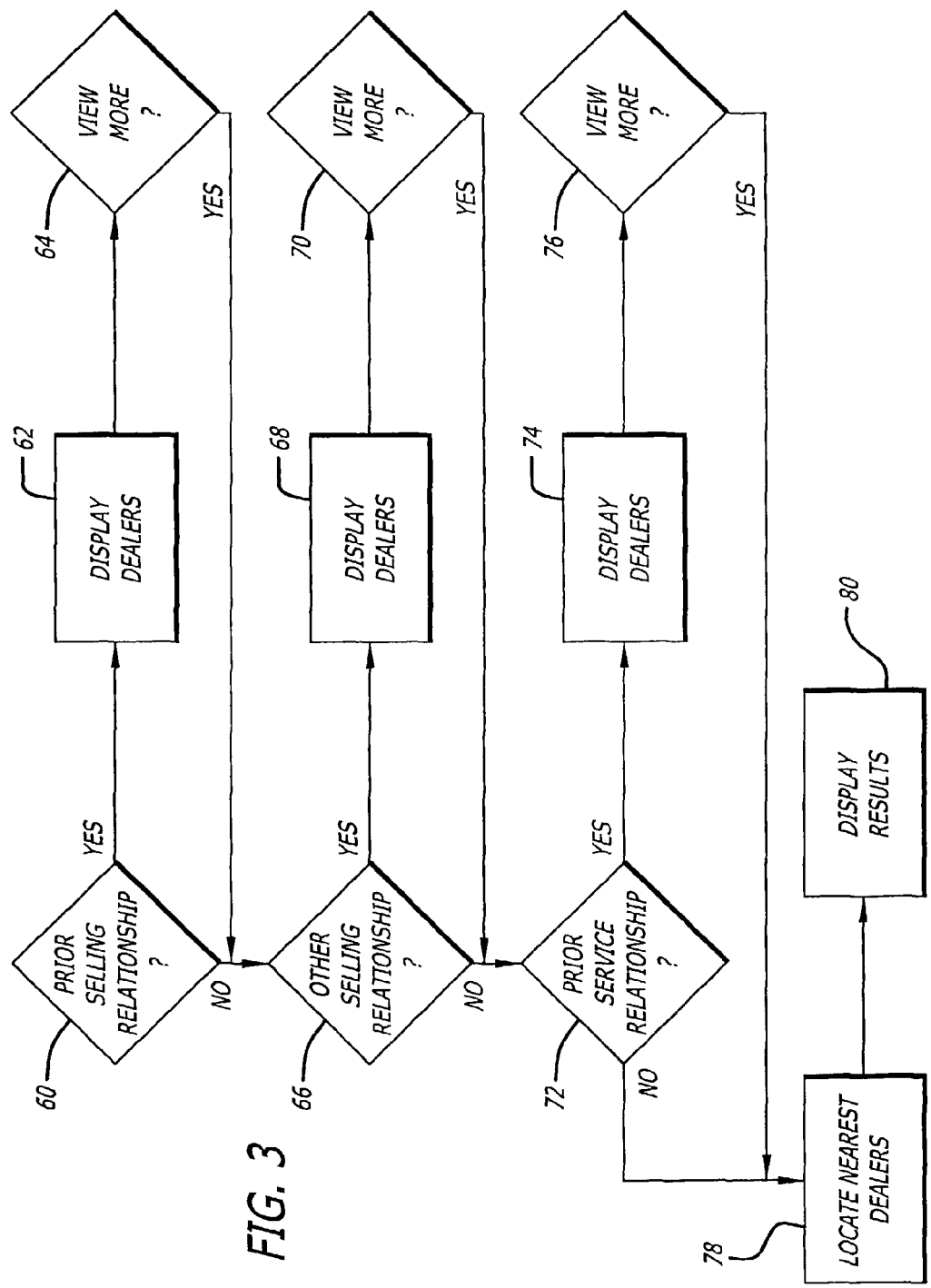
FIG. 3 is a flow diagram which outlines another embodiment of the present invention.

FIG. 3 illustrates one embodiment of the process steps involved with displaying the search results. The software at decision 60 determines if the user had a previous selling relationship with any dealers. If "yes," the software displays those dealers at step 62. A user may not want information about any of the dealers that are displayed, or he or she may want to see other dealers anyway. For example, the selling dealer may be distant or inconveniently located, or the customer may have developed a poor relationship with that dealer. Similarly, the customer merely may be curious about other dealers or may want to widen his or her choice. Therefore, the user wants to display more dealers. If so, the user will click the "view more" icon or other indicator at 64.

Choosing to view more dealers causes the software to determine at 66 if other selling relationships exist. Similarly, if the answer to prior selling relationships had been "no" at 60, the software will also look to query 66. This other selling relationship is optional and could include dealers that the user has previously contacted without completing a sale. It may also include other types of relationships such as a person who refers a customer (e.g., a parent of an adult child where the child purchases from the dealer). Again, if the software at decision 66 determines if the user had a previous other selling relationship with any dealers, the software displays those dealers at step 68. If the user clicks the "view more" icon at 70 or if query 66 returns a "no," the software queries for previous service relationships at query 72. If there are such relationships, the software displays them. See step 74. If no service relationships exist or if the user clicks "view more" at 76, the software locates the nearest dealers at 78 and displays the results at 80.

The display for each dealer may have links to additional information such as how to obtain a price quote, a map, driving directions, or other features. To obtain price information, the customer would fill in other forms including vehicle model, options and related information. The map and driving directions may store the customer's address, or the customer may be required to fill in a more detailed address form. The system likely would provide driving directions through links with a specialized mapping web service. The display also may show photographs of the dealership, hours of operation or other graphic and text information.

In this particular embodiment, the system software decides how much information is to be displayed on each web page at a time. For example, in this particular embodiment the data is divided into three sets of dealer information to be displayed. Each set of data is preferably displayed on a separate page, including a link to another page which include additional sets of data. The first set of data, the page of selling dealers, is displayed on the first page. The second page comprises the first and second sets of data; selling and service dealers. All selling and service dealers and their geographic vicinity are shown on third page.

The total number of pages will differ, depending on the results of the search. For example, if the customer search results in no dealer relationships detected in the database, then only one page of data may be displayed.

The list of dealers to be displayed is populated in an array. Depending on which page is to be displayed, the array will have selling dealers, selling plus servicing dealers or all dealers. The array contains all the necessary data to be displayed on the page for the customer. The system performs a check for the number of dealers to display to ensure that it is non-zero. Otherwise it redirects to a main search page with an error message. A cookie is also generated to indicate the current page number being displayed. This cookie is used to bring the customer to the correct page number if the customer goes to another page and then comes back to the dealer locator.

The software also prevents repeat displays for each dealer if the selling, service, and local dealers are the same.

Another feature of the present invention includes locating a nearby business based on the consumers address (zip code). This functionality requires the ability to code addresses geographically and to determine distance between two addresses. Vicinity.com is the service that allows location of dealers based on the distance from the dealer to another location, such as a customer's residence. Vicinity.com provides maps for display as well as driving directions. Vicinity.com provides a list of dealers sorted by ascending order of distance (nearest to farthest) based on the consumer's address and dealer type. Vicinity.com provides various application programming interfaces (APIs) to service Internet queries such as these. The Vicinity remote API or "VRAPI" is written to communicate with the Internet site. Exemplary embodiments communicate with the Internet site Vicinity.com or other similar sites or database through the use of a visual basic object, which opens an Internet connection, presents URL data for receiving the data from the opened Internet connection, and then closes the connection.

FIG. 4 is an exemplary screen shot that the user could use from his or her browser for entering information. FIG. 4 shows only the basic screen. As described above, this page presents the first step of the dealer search process. The customer enters personal information on the form to execute a dealer search. The dealer search emphasizes consumer-dealer relationships. The exemplary embodiment shows four forms fields, street address or cross-street 120, city and state or zip code 122 and a known dealer 124. Note that FIG. 4 does not have a field to enter the user name. It assumes that the user name is self-populating. The screen could be modified to add a name field or first and last name fields. The screen can denote required fields with an asterisk. The "dealer" field normally would be optional, and "street address" also may be an option. The form can populate fields automatically if a cookie is present with this information. After the customer completes the appropriate fields, he or she clicks the "submit" button 130 to submit the form information.

FIG. 5 is a screen shot of a possible results page that is displayed to the customer in one embodiment of the present invention. This page displays the dealer list based upon the customer input entered into the page of FIG. 4. This page displays the dealer list in three different sections. The first part of the display is a map 140. In this case, it is a map of West Los Angeles, Calif. Vicinity.com provides this map. It shows community or city names, freeways and some major streets. Landmarks also may be identified. One mark 142 also shows the location of the user's address. As is common, the user can re-center the map and zoom it in or out by following instructions on the screen.

The map also shows the location of the dealers found in the query. In this case, three dealers were located as shown by the logos 144, 146 and 148. The logos are numbered based on proximity to the user's location. In this case, logo 144 is marked with a "1" because it is the closest of the three. Logos 146 and 148 are marked with a "2" and "3," respectively.

The dealer at logo 144 is in text below the map. In this case, the dealer name, address and telephone number of the dealer at logo 144 is displayed at 150. If the dealer has its own website, that information is provided at a hyperlink 152 below the dealer's name and address. Likewise, if the dealer corresponds with clients using e-mail, an e-mail hyperlink 154 is provided below the dealer name and address. If the user wants driving directions from his or her location to the dealer, clicking on the hyperlink at 156 provides that information. In the exemplary embodiment, Vicinity.com provides the directions.

A similar text listing is provided for the dealer at logo 146 at text section 158, and text section 160 provides the text for the dealer at logo 148. Depending on the user's previous dealings with one or more of the dealers shown in FIG. 5, the user may have had a previous sale, service or no contact with one or more of the dealers. Further, it may be coincidental that the dealer at logo 144 is listed as "1." If the user had purchased a vehicle from one of the dealers shown, that dealer normally would be listed as dealer "1." Further, if a dealer is not shown on map 140, but the user had a previous selling relationship with that dealer, that dealer could be listed as dealer "1." The map may have to be zoomed out to show that location. The dealer also would be listed first in the text section. Depending on the way that the software is programmed, some or all of the currently displayed dealers may not be shown on the first page.

FIG. 5 also has the "search for more dealers" button 162 that allows the user to display more dealers. These dealers also may be shown with a map if desired.

Figure 6:
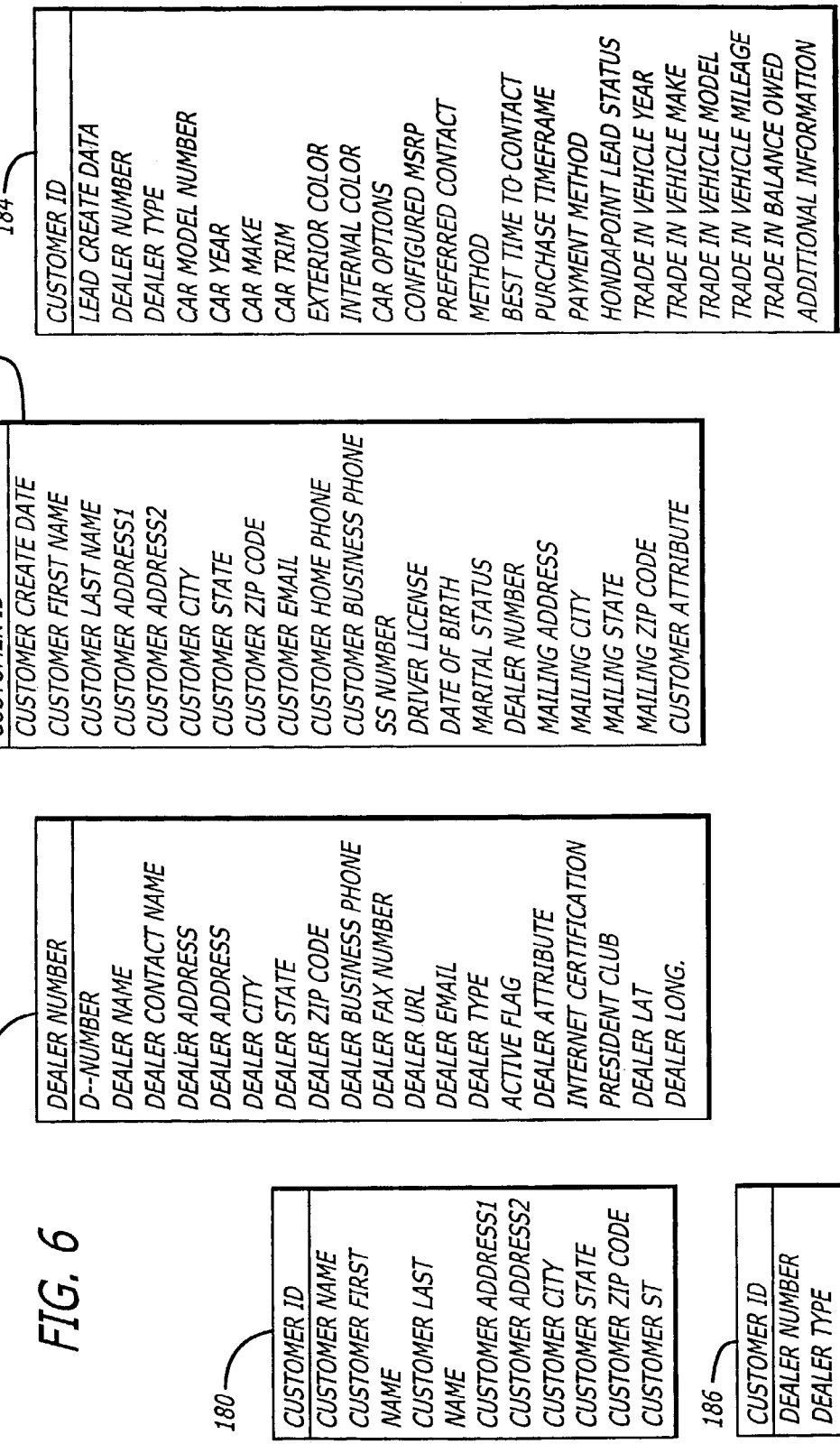
FIG. 6 is an example of the scheme of the of the database used in one embodiment of the present invention.

FIG. 6 shows the relationships between several tables in the database in an exemplary embodiment of the present invention. In this embodiment, the database is divided into several different tables. Customer information table 180 contains information such as the customer name, address, city, and state. The software uses this table to find matching records. The information that the customer enters in the fields of table 180 is compared to customer information in the existing database in table 182. The information in table 182 is gathered during previous customer contacts with the dealer. It includes information such as the customer's name and address that is used to compare with the information that the user enters in table 180.

Table 184 contains information about the customer that is added after the user provides information to one of the dealers. For example, if the user tells a dealer that he or she is interested in a particular model, the dealer or someone authorized by the dealer or manufacturer enters the model in the relevant field of table 184. That information can be made available to other dealers when the user contacts those dealers. The remaining two tables 186 and 188 contain dealer information. When the software finds a match between the customer in tables 180 and 182, table 182 has a dealer number for past contacts. The dealer number is also in tables 186 and 188. Table 186 shows the type of contact that a customer had with that dealer, and table 188 shows the information for that dealer. For example, table 188 contains the dealer's address, which is used for proximity location between the user's residence.

The present invention is not limited to returning results based on the type of prior relationship found. In one embodiment of the present invention, contact information stored in the database may include a ranking by the customer of their experience with each dealer. Perhaps a customer bought a car at one dealer and also has received service at another dealer. According to one embodiment of the present invention, the selling relationship would be listed first. However it is possible that the customer's experience at the service dealer was much more pleasant than the experience at the selling dealer. In this case, results may be ordered by a customer satisfaction rating, for example, which had been recorded in the database.

Though the exemplary embodiment of the present invention has been discussed with reference to separate dealers and manufactures, the invention is applicable to a single business with multiple locations. A customer may be more likely to buy repeatedly from that single business if he or she deals with the same salespeople for repeat business. Thus, the system could identify the salesperson with whom the customer dealt as well as other locations of the business at closer distances.

Those skilled in the art will understand that the preceding embodiments of the present invention provide the foundation for numerous alternatives and modifications thereto. These other modifications are also within the scope of the present invention. Accordingly, the present invention is limited solely by the claims that follow.

We claim:

1. An automated method implemented by a computer system for referring a prospective customer to one or more prospective dealers of a manufacturer's automobiles and/or automobile services comprising:
    the computer system prompting the prospective customer to enter customer information about the prospective customer, including information about the identity and location of the customer;
    the computer system receiving customer information about the prospective customer, including information about the identity and location of the customer;
    the computer system locating a first dealer of the manufacturer's automobiles and/or automobile services that had a prior contact with the prospective customer by searching a database of contact information, the database of contact information including historical data about prior contacts between a plurality of prospective customers, including the identity of each prospective customer, and a plurality of dealers of automobiles and/or automobile services, including information about:
        the identity and location of each of the dealers; and
        prior contacts which the prospective customers had with each dealer, including a reason for each prior contact;
    the computer system locating the reason for the prior contact between the prospective customer and the first dealer by searching the database of contact information, the located reason having been for servicing a vehicle;
    the computer system locating a second dealer of the manufacturer's automobiles and/or automobile services that had a prior contact with the prospective customer by searching the database of contact information, the located second dealer being located further from the prospective customer than the first dealer;
    the computer system locating the reason for the prior contact between the prospective customer and the second dealer by searching the database of contact information, the located reason having been for purchasing a vehicle;
    the computer system determining that one of the located dealers should be given preference over the other located dealer in a communication to the prospective customer which refers the prospective customer to at least one of the located dealers based on the located reasons the person had prior contacts with the located dealers, the computer system being programmed to give preference to a prior contact for the reason of purchasing a vehicle as compared to the reason of servicing a vehicle, the determining resulting in the second dealer being given preference over the first dealer because of the programmed preference; and
    the computer system communicating information to the prospective customer which refers the prospective customer to at least the second dealer, the information being organized or otherwise presented in a manner that gives preference to the second dealer over the first dealer, notwithstanding that the second dealer is further from the prospective customer than the first dealer.

2. The automated method of claim 1 wherein the information about the identity of the prospective customer includes at least a portion of the prospective customer's name.

3. The automated method of claim 1 wherein the information about the location of the prospective customer includes at least one from the group consisting of the prospective customer's address, zip code, city, or state.

4. The automated method of claim 1 further comprising:
    the computer system repeating the first three steps in connection with a different prospective customer;
    the computer system failing to locate in the database any prior contact between the different prospective customer and a dealer of automobiles and/or automobile services;
    the computer system locating in the database one or more dealers of automobiles and/or automobile services that are near the different prospective customer; and
    the computer system delivering information to the different prospective customer about at least one of the located dealers that are near the different prospective customer.

5. The automated method of claim 1 wherein the communicated information is divided into a plurality of sets.

6. The automated method of claim 5 wherein each set lists dealers that had a prior contact with the customer for the same reason.

7. The automated method of claim 5 wherein the communicated information is configured such that only one of the sets is viewable at a time.

8. The automated method of claim 5 wherein the communicated information is configured such that one of the sets has a link leading to another of the sets.

9. The automated method of claim 5 wherein the communicated information is configured such that the sets are displayed in order of the preference.

10. The automated method of claim 5 wherein each dealer listed in each set has a link for displaying a map of its location.

11. The automated method of claim 5 wherein each dealer listed in each set has a link for displaying directions to its location.

12. The automated method of claim 1 wherein the searching the database locates a prior contact between the prospective customer and a third dealer of automobiles and/or automobile services for the reason of purchasing a vehicle on a different date than the contact with the second dealer and wherein the communicating information gives preference to the prior contact with the most recent date.

13. The automated method of claim 12 wherein the giving preference includes highlighting the prior contact with the most recent date.

14. A system for referring a prospective customer to one or more prospective dealers of a manufacturer's automobiles and/or automobile services, the system comprising a central computer/server and a database of contact information, the contact information including historical data about prior contacts between a plurality of prospective customers, including the identity of each prospective customer, and a plurality of dealers of automobiles and/or automobile services, including information about the identity and location of each of the dealers and prior contacts which the prospective customers had with each dealer, including the reason for each prior contact, the central computer/server and database configured to:
  prompt the prospective customer to enter customer information about the prospective customer, including information about the identity and location of the customer;
  receive customer information about the prospective customer, including information about the identity and location of the customer;
  locate a first dealer of the manufacturer's automobiles and/or automobile services that had a prior contact with the prospective customer by searching the database;
  locate a reason for the prior contact between the prospective customer and the first dealer by searching the database of contact information, the located reason having been for servicing a vehicle;
  locate a second dealer of the manufacturer's automobiles and/or automobile services that had a prior contact with the prospective customer by searching the database of contact information, the located second dealer being located further from the prospective customer than the first dealer;
  locate a reason for the prior contact between the prospective customer and the second dealer by searching the database of contact information, the located reason having been for purchasing a vehicle;
  determine that one of the located dealers should be given preference over the other located dealer in a communication to the prospective customer which refers the prospective customer to at least one of the located dealers based on the located reasons the person had prior contacts with the located dealers, the computer system being programmed to give preference to a prior contact for the reason of purchasing a vehicle as compared to the reason of servicing a vehicle, the determining resulting in the second dealer being given preference over the first dealer because of the programmed preference; and
  communicate information to the prospective customer which refers the prospective customer to at least the second dealer, the information being organized or otherwise presented in a manner that gives preference to the second dealer over the first dealer, notwithstanding that the second dealer is further from the prospective.

15. The system of claim 14 wherein the information about the identity of the prospective customer includes at least a portion of the prospective customer's name.

16. The system of claim 14 wherein the information about the location of the prospective customer includes at least one from the group consisting of the prospective customer's address, zip code, city, or state.

17. The system of claim 14 wherein the central computer/server and database are configured to:
  repeat the first three steps in connection with a different prospective customer;
  fail to locate in the database any prior contact between the different prospective customer and a dealer of automobiles and/or automobile services;
  locate in the database one or more dealers of automobiles and/or automobile services that are near the different prospective customer; and
  deliver information to the different prospective customer about at least one of the located dealers that are near the different prospective customer.

18. The system of claim 14 wherein the communicated information is divided into a plurality of sets.

19. The system of claim 18 wherein each set lists dealers that had a prior contact with the customer for the same reason.

20. The system of claim 18 wherein the communicated information is configured such that only one of the sets is viewable at a time.

21. The system of claim 18 wherein the communicated information is configured such that one of the sets has a link leading to another of the sets.

22. The system of claim 18 wherein the communicated information is configured such that the sets are displayed in order of the preference.

23. The system of claim 18 wherein each dealer listed in each set has a link for displaying a map of its location.

24. The system of claim 18 wherein each dealer listed in each set has a link for displaying directions to its location.

25. The system of claim 14 wherein the central computer/server and database are configured to locate a prior contact between the prospective customer and a third dealer of automobiles and/or automobile services for the reason of purchasing a vehicle on a different date than the contact with the second dealer and wherein the communicating information gives preference to the prior contact with the most recent date.

26. The system of claim 14 wherein the giving preference includes highlighting the prior contact with the most recent date.

* * * * *